US012045854B2

(12) United States Patent
Mayster et al.

(10) Patent No.: US 12,045,854 B2
(45) Date of Patent: Jul. 23, 2024

(54) GEOSPATIALLY INFORMED RESOURCE UTILIZATION

(71) Applicant: Google LLC, Mountain View, CA (US)

(72) Inventors: Yan Mayster, Aurora, CO (US); Robert Bruce Bahnsen, Boulder, CO (US); Brian D. Shucker, Superior, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/802,248

(22) PCT Filed: Apr. 6, 2021

(86) PCT No.: PCT/US2021/025853
§ 371 (c)(1),
(2) Date: Aug. 25, 2022

(87) PCT Pub. No.: WO2022/216271
PCT Pub. Date: Oct. 13, 2022

(65) Prior Publication Data
US 2023/0274311 A1 Aug. 31, 2023

(51) Int. Cl.
*G06Q 30/02* (2023.01)
*G06Q 30/0204* (2023.01)
*G06Q 30/0242* (2023.01)

(52) U.S. Cl.
CPC ..... *G06Q 30/0246* (2013.01); *G06Q 30/0205* (2013.01)

(58) Field of Classification Search
CPC ........... G06Q 30/0246; G06Q 30/0205; G06Q 30/02; G06Q 30/0254; G06Q 30/0242; G06Q 50/10; G06F 16/29; G06T 17/05
See application file for complete search history.

(56) References Cited

U.S. PATENT DOCUMENTS

| 7,920,072 B2 * | 4/2011 | Smith | G09B 29/007 340/995.1 |
| 8,850,011 B2 * | 9/2014 | Kimchi | G08G 1/0962 709/226 |

(Continued)

FOREIGN PATENT DOCUMENTS

| EP | 1872294 A2 * | 1/2008 | ............. G01C 21/32 |
| JP | 2019-036048 | 3/2019 | |

(Continued)

OTHER PUBLICATIONS

Assessing brand visibility using machine learning; Technical Disclosure; Sujoy Banerjee et al.; Oct. 30, 2017. (Year: 2017).*
SmartAdP: Visual Analytics of Large-scale Taxi Trajectories for Selecting Billboard Locations Dongyu Liu et al. Jan. 2017. (Year : 2017).*
Determining Optimal Dimming of Displays, An IP.com Prior Art Database Technical Disclosure, IP.com Electronic Publication Date: Jan. 5, 2018 (Year: 2018).*

(Continued)

*Primary Examiner* — Marilyn G Macasiano
(74) *Attorney, Agent, or Firm* — Fish & Richardson P.C.

(57) ABSTRACT

Methods, systems, and apparatus, including computer programs encoded on a computer storage medium, for adjusting physical location usage for a plurality of particular locations. Methods can include obtaining a three-dimensional (3D) representation of the given geographic area, wherein the 3D representation depicts a view of the given geographic area from a specified viewing perspective. For the given geographic area, traffic data is obtained indicating different traffic volumes during different time periods and one or more traffic characteristics. The 3D representation is segmented into a plurality of particular locations. For each particular location among the plurality of particular locations and based on the traffic data, a viewability score is determined that indicates an aggregate amount of time that the particular location is viewable by traffic passing the different locations. Physical location usage is then adjusted based on the viewability scores for the plurality of particular locations.

20 Claims, 7 Drawing Sheets

(56) References Cited

U.S. PATENT DOCUMENTS

| | | | |
|---|---|---|---|
| 10,042,359 B1 | 8/2018 | Konrardy et al. | |
| 2006/0053110 A1* | 3/2006 | McDonald | G06Q 30/02 |
| 2010/0050201 A1* | 2/2010 | Kubota | G06Q 30/0273 |
| | | | 705/14.69 |
| 2011/0131597 A1* | 6/2011 | Cera | G06F 3/04815 |
| | | | 725/24 |
| 2015/0161682 A1* | 6/2015 | Karamchedu | G06Q 30/0277 |
| | | | 705/14.73 |
| 2015/0227965 A1* | 8/2015 | Drysch | G06Q 30/0246 |
| | | | 705/14.45 |
| 2020/0151265 A1* | 5/2020 | Gupta | G06Q 10/02 |
| 2020/0184862 A1* | 6/2020 | Kim | G09F 9/35 |

FOREIGN PATENT DOCUMENTS

| | | | |
|---|---|---|---|
| JP | 2019-036049 | 3/2019 | |
| KR | 10-1213857 B1 * | 12/2012 | G08G 1/123 |
| WO | WO 2006/029022 A2 * | 3/2006 | G06F 17/30 |
| WO | WO 2020183652 | 9/2020 | |

OTHER PUBLICATIONS

Andrew Simmons; Iman Avazpour; Hai L. Vu; Rajesh Vasa, Hub Map: A new approach for vizualizing traffic data sets with multi-attribute link data (English), 2015 IEEE Symposium on Visual Languages and Human-Centric Computing (VL/HCC) (pp. 219-223), Jan. 22, 2016 (Year: 2016).*

Meng Huang; Zhixiang Fang; Shili Xiong; Tao Zhang, Interest-Driven Outdoor Advertising Display Location Selection Using Mobile Phone Data (English), IEEE Access (vol. 7, pp. 30878-30889), Jan. 1, 2019 (Year: 2019).*

International Search Report and Written Opinion in International Appln. No. PCT/US2021025853, dated Dec. 22, 2021, 13 pages.

Extended European Search Report in European Appln. No. 23211019.7, mailed on Feb. 26, 2024, 6 pages.

Notice of Allowance in Japanese Appln. No. 2022-557924, mailed on Nov. 6, 2023, 5 pages (with English translation).

Office Action in Canadian Appln. No. 3,185,316, mailed on Nov. 30, 2023, 4 pages.

Office Action in Korean Appln. No. 10-2022-7032011, mailed on Apr. 29, 2024, 14 pages (with English translation).

* cited by examiner

GEOSPATIALLY INFORMED RESOURCE UTILIZATION

CROSS-REFERENCE TO RELATED APPLICATIONS

This application is a National Stage Application under 35 U.S.C. § 371 and claims the benefit of International Application No. PCT/US2021/025853, filed Apr. 6, 2021, the entirety of which is incorporated herein by reference.

BACKGROUND

This specification relates to data processing and resource utilization.

Constructing, operating, and maintaining public display systems can be resource intensive. For example, operating an outdoor display can consume power and network resources, and these resources can be wasted if the public display system is not actively managed.

SUMMARY

In general, one innovative aspect of the subject matter described in this specification can be embodied in methods including the operations of obtaining, for a given geographic area, a three-dimensional (3D) representation of the given geographic area, wherein the 3D representation depicts a view of the given geographic area from a specified viewing perspective; obtaining, for the given geographic area, traffic data indicating (i) different traffic volumes during different time periods and (ii) one or more traffic characteristics; segmenting, by one or more computing devices, the 3D representation into a plurality of particular locations; determining, for each different particular location among the plurality of particular locations and based on the traffic data, a viewability score indicative of an aggregate amount of time that the different particular location is viewable by traffic passing the different candidate location; adjusting physical location usage based on the viewability scores for the plurality of particular locations.

Other implementations of this aspect include corresponding apparatus, systems, and computer programs, configured to perform the aspects of the methods, encoded on computer storage devices. These and other implementations can each optionally include one or more of the following features.

In some aspects, the features include obtaining trip data specifying geographic paths traversed by travelers passing through the given geographic area, wherein the travelers include (i) drivers of vehicles that pass through the given geographic area, (ii) passengers of the vehicles that pass through the geographic area, or (iii) additional persons who travel through the geographic area, but are neither drivers nor passengers.

In some aspects, the specified viewing perspective includes one or more of a driver's field of view that specifies the field of view of the geographic location for the drivers, a passenger's field of view that specifies the field of view of the geographic location for the passengers, or an additional person's field of view that specifies the field of view of the geographic location for additional persons.

In some aspects, the one or more traffic characteristics includes (i) a speed of the vehicles that pass through the given geographic area, (ii) a number of drivers or passengers of the vehicles that pass through the given geographic area, (iii) visibility characteristics during a time of the day when the one or more traffic characteristics are recorded.

In some aspects, determining the viewability score for a geographic location includes a total time during which a physical structure located in the given geographic area is in the viewing perspective of the drivers, passengers or the additional people.

In some aspects, adjusting the physical location usage of the one or more geographic locations includes: constructing a physical structure in the one or more geographic location; removing existing physical structures from the one or more geographic location; changing power usage characteristics for the display of content on the physical structures in the one or more geographic location; placing one or more contents on the physical structure of the one or more geographic location; or adjusting the viewing characteristics of the one or more contents that is presented on the physical structure of the one or more geographic location;

In some aspects, determining the viewability score for a geographic location further includes: determining a viewing time of the users in the vehicles while travelling on the geographic path through the geographic area; determining an attention factor of the users in the vehicles while travelling on the geographic path through the geographic area based on one or more traffic characteristics; determining an expected number of users in the vehicles in the traffic; computing a viewability score based on the viewing time, attention factor and the expected number of users in a vehicle.

Particular embodiments of the subject matter described in this specification can be implemented so as to realize one or more of the following advantages. For example, the techniques discussed throughout this document determines a location in a geographical area that can be used to construct a physical structure that can efficiently and effectively present information to people present in a geographic area near the physical structure. The location of the physical structure can be selected to ensure that at least a specified number of people will be able to view the physical structure, such that resources used to present information on the physical structure will be efficiently used. For example, from among multiple available geographic areas, a particular geographical area that maximizes the number of people that are able to view content presented on the physical structure can be selected so that the resources required to build, maintain, and operate the physical structure can be more efficiently used. In a specific example, the techniques described herein can provide more efficient use of energy (e.g., less energy usage) for powering an outdoor display by limiting presentation of information on the display to times when a threshold number of people will be able to view the information presented on the display. In some situations, the display can be toggled on/off based on information about traffic passing the outdoor display, thereby reducing the energy consumed by the outdoor display. In some situations, lights that illuminate the outdoor display can be similarly toggled on/off based on information obtained using the techniques discussed herein to reduce the amount of time that the lights are on, which will lead to better energy efficiency. In still other situations, information generated using the techniques discussed herein can be used to better position outdoor displays to ensure that they are sufficiently viewable, thereby reducing wasted energy, network resources, and physical resources required to erect the outdoor display. This can lead to less misuse of physical locations, and fewer abandoned outdoor displays that were erected without the benefit of the information generated using the techniques discussed herein. This can also lead to more effective outdoor displays that may not need to be as large as otherwise required, which again can lead to less energy consumption, as compared to other locations that may require a larger display to be as effective. The techniques can be used to efficiently allocate fewer locations for constructing new physical structures for presenting information and yet achieve a higher desired effect when compared to constructing more than required physical structures in multiple different locations thereby preventing any adverse effect on the landscape of the geographic area. The techniques further enable the quantification of the effect of displaying content via physical structures that can be used to upgrade the existing physical structures for better viewability using updated electronics that use less power and may communicate over a network more efficiently, which further includes saving valuable resources such as electricity used for operating the physical structures. The techniques discussed herein can also be used to determine which physical structures are used to present which content so that the content presented on each physical structure is appropriate, and more useful, for the audience passing the physical structure.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
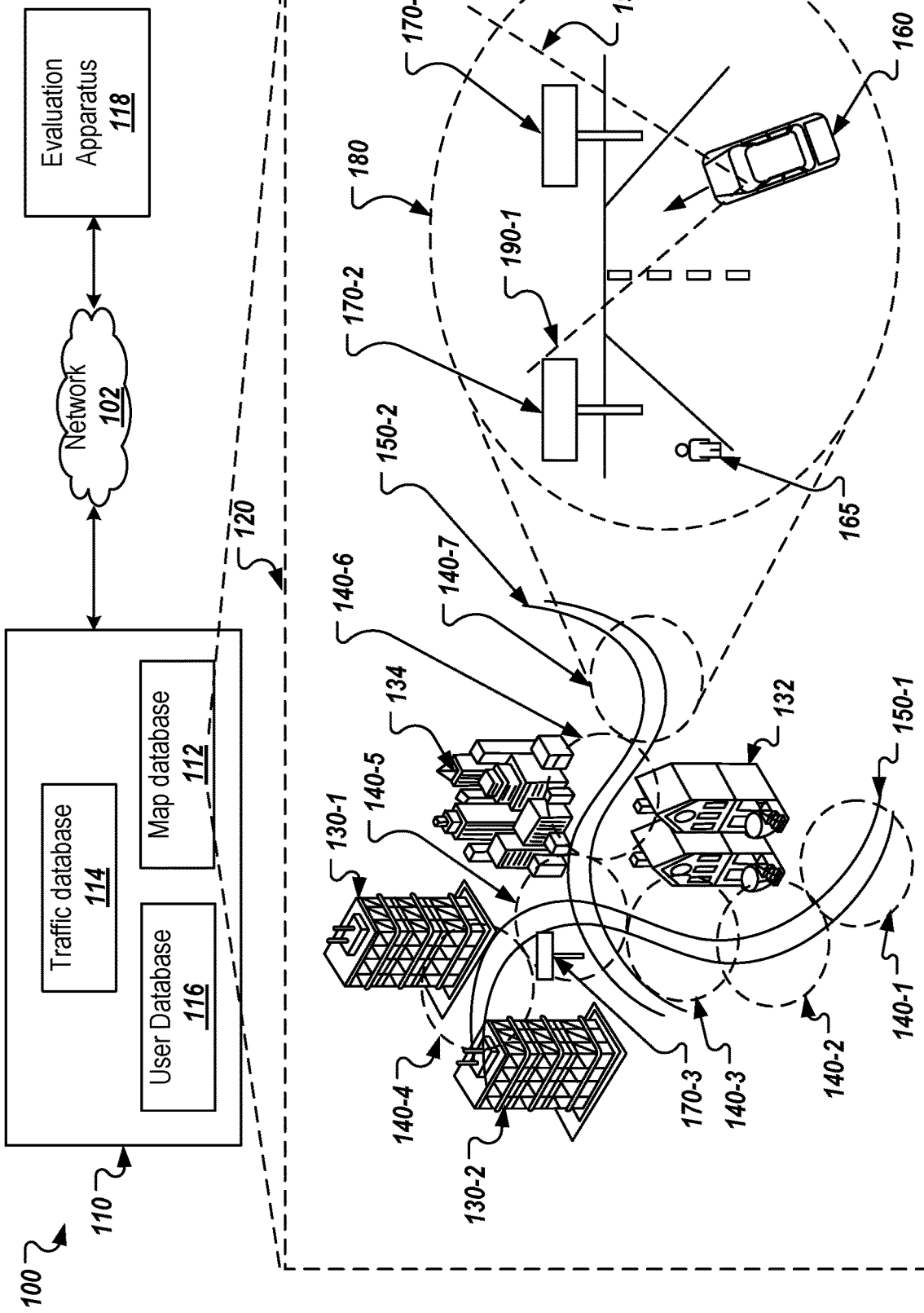
FIG. 1 is a block diagram of an example environment in which a web based geospatial mapping service is implemented.

This document discloses methods, systems, apparatus, and computer readable media that can determine a suitable geographic location for a physical structure to display content or adjust the characteristics of an already existing physical structure in a physical location by modifying the display characteristics of the physical structure.

In general, displaying content on a physical structure is an efficient way to present the content to a big audience. However, such a technique of presenting content can be ineffective, and resources will be wasted, if the physical structure is not placed in a carefully selected location where it can be viewed properly by an audience large enough to justify the resource utilization. For example, consider two physical structures A and B which are identical in all other aspects (e.g., the dimensions of the physical structure, the surface area on the physical structure where the content is to be displayed, etc.) other than their geographical locations. For purposes of this example, assume that the physical structure A is located next to a busy highway and is readily visible to passing traffic without any obstruction. Also assume that the physical structure B is located close to the same highway but behind a building that makes structure B only partially visible to the traffic on the highway due to the obstruction caused by the building. In this example, the physical structure A would seemingly be the first choice for displaying content due to the unobstructed view, but absent actual data regarding the visibility of the structures, the differences in viewability from different types of passengers of vehicles, and/or the impact of the visibility of the structures on conveying information, it is difficult to determine which of the locations would have been better, particularly prior to construction of the structures. In another example, consider two physical structures C and D, which are identical in all other aspects (as described in the previous example) other than their geographical locations. The physical structure C is located next to a highway that has a heavy volume of traffic and the physical structure D is located next to a street that in general has a lower volume of lower speed traffic as compared to the traffic volume of the highway. Since a greater number of people will be able to see the content on physical structure C than D, physical structure C could have a higher priority for being selected for displaying content. However, as discussed in more detail below, the slower speed of the traffic passing by structure D could make it a better candidate depending on the information being presented due to a longer viewing time for passengers of the slower moving traffic.

As explained in the previous examples, the viewability of content on the surface of a physical structure in a geographic location plays a major role in determining the effectiveness/usefulness of the physical structure. Also, an analysis of the viewability can be used to modify resources allocated to the physical structures on a dynamic basis so that consumption of resources by the physical structures (e.g., powering lights that illuminate the physical structures, powering electronic displays, and/or network resources utilized to transfer information to electronic displays) can be managed to provide more energy efficient conveyance of information. The techniques and methods described in this document can calculate a viewability score based on an analysis of the viewability of content displayed on a physical structure (or proposed physical structure) on a location by location basis within a geographic area. The techniques can be used to select a location to either construct a new physical structure or adjust the display properties when a physical structure already exists in the location. For example, if the viewability score of a location having a physical structure is less during night time, the display characteristics can be adjusted by making the display surface of the physical structure more visible (e.g., by installing more lighting for night time visibility). Alternatively, the display characteristics can be adjusted by turning off the power supply to the physical structure thereby saving valuable resources and operational costs.

The techniques and methods discussed herein can also be used to determine the relative costs of constructing and maintaining physical structures in different geographic locations. While selecting a geographic location for constructing a physical structure, the viewability score of the geographic location can be used to determine the costs associated with acquiring the geographic location. For example, a geographic location with a higher viewability score can have a higher monetary value compared to another geographic location with lower viewability score. These techniques and methods can further be used to determine a value associated with presenting content on the physical structures in a geographic location. For example, the cost incurred by an entity (e.g., person or business) to present content on a physical structure can be determined on the basis of the viewability score. In some situations, the cost can increase in proportion to the viewability score.

The techniques and methods can also be used to determine the amount of content exposure that people are subjected to via the physical structures. Some of these exposures to content may contribute to the people performing a specified target action. For example, a user that is exposed to a content about an endangered species on a physical structure while driving to work every day, may sign up for a newsletter directed to helping save that endangered species via a phone number or a website displayed within the content, where signing up for the newsletter can be considered the specified target action. Similarly, a user that is exposed to content about a particular type of mobile device may ultimately acquire that particular type of mobile device, where acquisition of the mobile device may be considered the target action.

The techniques and methods can also be used to determine the relative contribution of each content exposure that the user experiences via the content displayed by one or more physical structures (e.g., along a travel route). For example, a user traveling through a geographic area may get exposed to two or more physical structures displaying content related to shoes of a particular brand X. If the user purchases shoes of brand X, then the performance of the target action of purchasing shoes of brand X can be partially attributed to each of the two or more exposures based, for example, on the level of exposure (e.g., number of exposures or total duration of exposure).

The techniques and methods can be further used to determine relative contribution of different types of content exposures. For example, people connected to the internet are exposed to a variety of content (e.g., search results, web pages, digital components, news articles, social media posts, audio information output by a digital assistant device). Exposure to content presented on physical structures is another type of content exposure. Additionally, the physical structures can support subsets of exposure types, such as still image exposures, text exposures, video exposures, audio exposures, interactive exposures, or other types of exposures. Other types of content exposures can include exposure via radio, pamphlets etc. Using the techniques, a contribution of these exposures including different types of exposures towards the performance of a target action can be determined which can further be used to evaluate and adjust the characteristics of the medium of content display.

FIG. 1 is a block diagram of an example environment 100 in which a web based geospatial mapping service is implemented. The environment 100 includes a map server 110 which is a computing system that includes a map database 112, a traffic database 114 and a user database 116. Even though the map server 110 is shown as a single unit, the map server 110 can be implemented as a distributed system capable of communicating over a network 102 that can include a combination of networks, such as cellular network, Wi-Fi network, LAN, WAN, the Internet, and/or other suitable network and can include any number of wired or wireless communication link.

The map database 112 stores map data for features (e.g., roads, buildings, water bodies, schools, businesses etc.) that can be used to generate a digital map. A digital map, also referred to as a map for brevity, is a visual representation of a particular area of the world as viewed from an overhead viewpoint that includes features such as buildings, businesses, other features that are commonly shown on maps. The map data may include location information (e.g., GPS coordinates, latitude and longitude) and other attribute information (e.g., name, size, shape) for various features.

The map can be a two-dimensional (2D) representation (referred to as a 2D map) or a three dimensional (3D) representation (referred to as a 3D map) of a particular area. For example, a 3D representation of a particular location on the map can include images of the particular location at approximately street level (e.g., similar to the height of a human observer that is also referred to as a street view). Each image is associated with a particular location and a directional orientation so that 360-degree panoramic views can be created from the images. The images can include actual photographs or images captured at many geographical locations throughout the world. For example, the images may have been captured with a vehicle-mounted camera that is elevated above the ground. The images can also include computer generated renderings, using 3D modeling techniques, as well as analysis and integration of photographs.

The map database 112 can also include information related to roads such as streets and highways. In addition to road images, the road information can include the location of roads relative to a geographic area or other roads. For instance, the map database 112 may store information indicating a network of roads, including information like the number of lanes in the road and whether the road is one-way or two-way, entry and exit points on the roads etc. The road information can further include street names and other information, such as distance between intersections and speed limits.

The map database 112 can also include points-of-interest. A point-of-interest may be any feature in the map that may be interesting or informative to users and that is associated with a geographical location. For instance, a point-of-interest may include a landmark, stadium, or building. A point-of-interest may be added to the map database 112 by professional map providers, individual users, or other entities.

The user database 114 of the map server 110 may include information optionally provided by one or more users of the geospatial mapping service. Client devices (e.g., smartphones) can include location monitoring components configured to generate location information related to the current location of each device, which may then be transmitted to the map server 110 and stored in the user database 114 when location services are enabled at the client device. For example, a user can share information related to the trips undertaken by the such as preferred route information, current location information, historical routes taken by the user, geographic area information or other information with map server 110. This information can be used by the map server 110 in determining a particular route and/or performing any other tasks provided by the map server 110 as a service to the user.

The traffic database 116 can include traffic information that can be used in the computation of a route. For instance, the traffic database 116 can include real-time traffic conditions obtained from, for instance, a traffic service. Moreover, the traffic database 116 can include information obtained from public agencies, roadway monitors, traffic cameras, etc. The information can include both real-time and historical information concerning the speed of traffic flow at particular points in a transportation system.

FIG. 1 also shows a map of an example geographic area 120. The map of geographic area includes buildings (110-1 and 110-2), city block (120), residential area (130), streets (150-1 and 150-2) and multiple geographic locations (140-1 to 140-7). The figure also includes an expanded view of the geographic location 140-7 that includes a portion of the street 150-1, a vehicle 160 (e.g., a car), a person 165 and three physical structures (170-1 to 170-3).

For the purpose of explanation, the techniques and methods are described using an example in which a location (140-1 to 140-7) within the geographical area 120 is being selected for construction of a physical structure. In this example, the physical structure can be constructed, for example, in the location that maximizes the expected viewability of content displayed on the newly constructed physical structure. Note that the process can also be used to select a location with an existing physical structure so as to upgrade the display characteristics that increases the viewability of the content displayed on the physical structure, and/or reduces power consumption of the physical structure. To determine a geographic location within a geographic area 120, the environment 100 further includes an evaluation apparatus 118 that uses a 3D map, user data and traffic data of the geographic area 120.

In some implementations, the evaluation apparatus 118 is configured to segment the 3D map of the geographical area 120 into a plurality of locations and evaluate each location based on the expected viewability of content when displayed on a physical structure in each of the locations. For example, the evaluation apparatus 118 segments the geographic area 120 into geographic locations 140-1 to 140-7.

The evaluation apparatus 118 is configured to determine a viewability score for each particular location (e.g., 140-1 to 140-7) among the plurality of locations. In some implementations, the viewability score for a particular location indicates an aggregate exposure level provided by a physical structure (existing or proposed) located at that particular location. For example, the viewability score can indicate an aggregate amount of time that a content displayed on a physical structure of the location is viewable by traffic passing the particular location. More specifically, the viewability score can indicate how long people passing the physical location would be exposed to (e.g., able to view) content presented on a physical structure located at the geographic area. In some situations, the viewability score accounts for how long the content is determined to have been perceived by a person (e.g., based on context surrounding the exposure) instead of how long the content was viewable by the person. For example, content displayed on a physical structure at a particular location may be visible to a person (e.g., a driver of a vehicle in the traffic) for a certain amount of time (e.g., 30 seconds) but the evaluation apparatus 118 may determine that the person actually takes notice of the content for a much shorter duration of time (e.g., 5 seconds) because of their attention to driving and surrounding traffic. In this example, the evaluation apparatus 118 may use the shorter duration of time for purposes of determining the viewability score for the particular location as it relates to car drivers. However, the evaluation apparatus 118 may use the longer duration of time for purposes of determining the viewability score for the particular location as it relates to passengers of cars. As such, a different viewability score can be computed for different types of audiences (e.g., drivers, passengers, forward facing passengers, rear facing passengers, etc.).

Additionally, viewability scores can be generated based on other contextual information. For example, viewability scores can be generated on a per-topic or per-business-type basis. In this example, the viewability scores can be determined, at least in part, based on a measure of relevance of the topic or business type to people who will be exposed to content displayed to the people passing the physical structure. For example, assume that the viewability score is being determined for a jewelry store (or the topic of jewelry). In this example, the viewability score can be determined, based at least in part on, a portion of people passing the physical structure who ultimately went to a jewelry store, searched for jewelry online, or otherwise have expressed an interest in jewelry. In this way, the viewability score can be specialized to provide an indication of the values of different available physical structures for presenting content related to the topic or business type for which the viewability score was generated. In some situations, the viewability scores (or specialized viewability scores) can be presented in a map interface, which can enable an entity searching for physical locations to present content to compare the viewability scores of the different physical locations, and make a selection based on the relative viewability scores.

To compute the viewability score of a location, the evaluation apparatus 118 uses the 3D map to identify geographic paths in the geographic area 120. The paths can include roads, sidewalks, walking trails, or other types of paths. After identifying the paths, the evaluation apparatus 118 determines a number of people in the geographic area that can get exposed to the content displayed by a physical structure at the location. The people can include the drivers and passengers of vehicles passing through the previously identified geographic paths. The people can also include additional people who are neither drivers nor passengers but are present in the geographical area 120 (e.g., walkers). The evaluation apparatus 118 further takes into consideration a level of attention that the people might have while viewing the content. The evaluation apparatus 118 then determines the viewability score that indicates an aggregate amount of time that a physical structure in the location is (or is expected to be) viewed by the people in the geographic area 120. Each of these factors and their use by the evaluation apparatus 118 is explained in more detail below.

In some implementations, the evaluation apparatus 118 can determine, based on the 3D map of the geographical area 120, paths from which a physical structure in a location can be viewed. The evaluation apparatus 118 also determines, for each path, a period of time that the physical structure is viewable from travelers on the path. For example, content displayed on the physical structure 170-3 in the location 140-5 of the geographic area 120 can be viewed from the geographical paths 150-1 and 150-2. In this example, the evaluation apparatus 118 can use traffic data indicating different traffic volumes during different time periods and/or other traffic characteristics to generate the viewability score for the location, as discussed further below.

In some implementations, the evaluation apparatus 118 can use trip data specifying different geographic paths traversed by travelers (e.g., people moving along the paths) passing through the geographic area 120 as part of the viewability analysis. The trip data can include, for example, the paths taken by the travelers, speed information, time of day information, and/or other information related to the trip. If the viewability score is computed over a time interval (e.g., a particular hour of a day, a week, or some other specified time interval), then trips made during the time interval can be identified, and the trip data for these trips can be used to calculate the viewability score. For example, assume that the viewability score is being computed for a particular time period (e.g., afternoon rush hour), and that a particular location (e.g., of an existing or potential physical structure) is viewable from two different paths. In this example, evaluation apparatus 118 can determine a viewability score for the particular location based on the aggregate amount of time that the particular location was viewable to travelers on the two paths during the particular time period, as indicated by the trip data for those travelers. In some implementations, the aggregate amount of time the particular location was viewable to the travelers is based on the total number of people (i.e., drivers and passengers) in the vehicles and any additional people passing through the two paths during the particular time period. In some implementations, the viewability score can be determined for a subset of the people (e.g., passengers only).

In some implementations, the evaluation apparatus 118 can use trip data specifying different geographic paths traversed by a subset of travelers to perform an entity specific viewability analysis. For example, the evaluation apparatus 118 can select a subset of travelers who visited one or more destinations (e.g., stopping points) associated with a specific entity (e.g., a particular jewelry store), or a specific type of entity (any jewelry store), to determine specialized viewability scores of physical structures for that specific entity, or specific type of entity. The subset of travelers can include travelers traversing different geographic paths to reach a geographic location of a specific entity (e.g., a particular type of business) or specific geographic locations contextually related to the specific entity. In such implementations, the evaluation apparatus 118 can determine the viewability scores of physical structures as candidates for presenting entity specific content (e.g., content provided by the entity or content that is contextually related to the entity), which can then be used by the specific entity to select which of the physical locations will be used to present the content provided by the specific entity (e.g., the physical location with the highest viewability score). In these implementations, the viewability scores can be presented in a map interface, which enables the specific entity to evaluate the various candidate physical locations based on their respective viewability score, and select one or more particular physical structures at one or more locations to present content. In these implementations, the viewability score can be considered an indication of the value of the physical structure to the specific entity for presenting content.

To account for the effects of traffic on the viewability of a location, the evaluation apparatus 118 can use traffic data from the traffic database 114 to adjust the viewability score. The traffic database 114 includes different traffic volumes recorded during different time periods of the day, as well as traffic speeds. Traffic volume of a segment of road refers to the number of vehicles passing via the segment of road in a given time interval. Traffic volume can change based on a plurality of factors including different times of the day, season of the year etc. For example, on weekdays, traffic volume can be high on roads closer to businesses during mornings and evenings due to a higher number of people commuting for work and then back home. Sources of traffic volume data can include public agencies, roadway monitors, and traffic cameras. In some implementations, the traffic volume data can also be obtained using the location information of the vehicles shared by the drivers or passengers of the vehicles with the map server 110.

In some implementations, when information related to the volume of traffic is not available, the evaluation apparatus 118 can generate an estimate of the traffic volume based on historical data. For example, if the traffic volume for a particular location is unavailable for a path in the subset of paths for period of time, the evaluation apparatus 118 can model the traffic of the path as a time series based on historical records of traffic recorded previously and generate an estimate of the traffic based on the date, time of the day, weather conditions, etc. In some implementations, the evaluation apparatus 118 can generate a machine learning model trained to process input parameters such as the date, time of the day, and/or weather conditions to generate a prediction of the volume of traffic.

In some implementations, the evaluation apparatus 118 can determine the number of people in traffic (e.g., drivers and passengers) traversing through the subset of paths based on traffic data using one or more of the following techniques. For example, artificial intelligence and computer vision techniques can be used to process video and/or images of vehicles to predict vehicle occupancy. One or more images captured using one or more cameras located in one or more locations in the geographical area 120 can depict the geographical area 120 that includes the roads and vehicles in the traffic. Using object detection techniques each individual vehicle can be identified and a new cropped image can be generated that depicts only the vehicle (or the vehicle and a portion of the surrounding environment). The new image can be processed using a machine learning model that is trained to predict the number of people in the vehicle. This process can be repeated over all the vehicles in the image (or a series of images) thereby determining an expected number of people in traffic.

In some implementations, the evaluation apparatus 118 can determine the number of people in traffic based on trip data. For example, if three out of the four passengers in a vehicle share location information with the map server 110, the map server 110 can determine, based on multiple records of each of the three passengers in different locations recorded during the same time intervals, that there are at least three people traversing in a vehicle. A similar computation can be performed by the map server 110 for all the vehicles traversing through the subset of paths to determine an approximate number of people on the road (e.g., in traffic). In another example, the evaluation apparatus 118 can use heuristics to determine the number of people on the road. For example, a vehicle occupying a high-occupancy vehicle (HOV) lane can be assumed to have more than a threshold number of passengers including the driver (e.g., more than one or at least the minimum number of passengers required to use the HOV lane). The threshold number of passengers can depend upon the traffic rules implemented for the geographical area 120.

The number of people in the geographic area 120 can also include additional people who are neither passengers nor drivers of vehicles, but can view the content displayed on a physical structure of a particular location. For example, additional people such as pedestrians and cyclists present in the geographical area 120 can also view content that is displayed on physical structures of different geographical locations of the geographic area 120. Modelling can be used to estimate the number of additional people in the geographical area 120 during any time of the day.

In some implementations, the evaluation apparatus 118 can consider the speed of the vehicles traveling along the paths to determine the viewing time of the drivers and passengers of the vehicles. For example, assume that a vehicle traversing one of the paths is approaching a section of the path from which a physical structure at a particular location can be viewed. The speed at which the vehicle traverses the section of the path determines how long the content on the physical structure can be viewed by the drivers or the passengers of the vehicle. More specifically, faster moving vehicles are going to have a shorter viewability period, whereas slower moving vehicles are going to have a longer viewability period.

Similar to the traffic volume data, the map server 110 can receive data related to the speed of the vehicles in traffic using roadway monitors, traffic cameras, etc. In some implementations, the map server 110 can infer the speed of the vehicles from the location information shared by one or more drivers or passengers of vehicles in the geographic area 120. For example, if a driver or a passenger of a vehicle shares location information with the map server 110, the map server 110 can take two sequential readings of locations of the vehicle and the time taken for the vehicle to travel between two locations to compute the speed of the vehicle. In some implementations, rather than individual speeds of each vehicle in the traffic, all vehicles in the traffic at a time interval can be represented by the average of the speeds of vehicles. This helps mitigate the problem where speeds of one or more vehicles in the traffic cannot be observed or recorded. The speed of the vehicles in traffic depends upon the volume of traffic. However, it can also depend upon the speed limit of the geographic path in the geographic area 120, the weather, and time of the day.

In some implementations, the evaluation apparatus 118 takes into consideration a viewing perspective and the field of view of the people, including drivers and passengers of vehicles in the subset of paths, and the additional people that are present in the geographic area, to determine the viewability of locations within the area. The field of view of a person refers to a portion of the observable world that can be seen at any given moment. For a person to be able to see the surface of a physical structure displaying content, the physical structure in a geographic location will be within the field of view from the viewing perspective of the person. For example, FIG. 1 shows an expanded view 180 of the geographic location 140-7, where the vehicle 160 is traversing through the geographical location 140-7. Assuming that the driver is on the left side, the lines 190-1 and 190-2 show the field of view of the driver of the vehicle 160 that includes the physical structure 170-1, but does not include the physical structure 170-2. The field of view of a person can also change based on the seating arrangement of the person in the vehicle. For example, a passenger sitting in the rear seat of a vehicle, such as a sedan having two rows of seats, will have an obstructed front field of view due to the driver, the front row seats of the sedan, and any passenger occupying any seats in front.

In some implementations, the evaluation apparatus 118 characterizes each person including drivers, passengers, and additional people in the geographic area 120 based on their attention factor. The attention factor of a person is an indication of the level of details that a person observes in the person's field of view. The attention factor of a person can also provide an indication of the level of detail that a person observes regarding the content displayed by physical structures in the person's field of view. The attention factor of a person can change based on activities performed by that person. For example, a driver driving the vehicle will have a lower attention (and corresponding attention factor) towards content displayed on physical structures as compared to the attention of a passenger sitting beside the driver, assuming that the passenger is not engaged in another activity (e.g., browsing the web on a mobile device). The attention factor of a person can also change based on the one or more traffic characteristics that includes the speed of vehicles passing through the geographic area, a number of drivers or passengers of the vehicles that pass through the given geographic area, and visibility characteristics during a time of the day when the one or more traffic characteristics are recorded. For example, people within the geographic area 120 will generally have a higher attention factor during daytime since content on the physical structures are more visible due to day time lighting conditions, assuming that the physical structure is not illuminated at night. In another example, drivers and passengers of vehicles that pass through the geographic area 120 at a higher speed, will generally have less time to focus on the content displayed on the physical structures, thereby leading to a lower attention factor.

In some implementations, the evaluation apparatus 118 can determine a new field of view for a person based on the attention factor. For example, assume that the attention factor is a value between 0 and 1. The evaluation apparatus 118 can determine a new field of view for the person by multiplying the field of view with the attention factor. The field of view and the attention factor is further explained with reference to FIG. 2.

Figure 2:
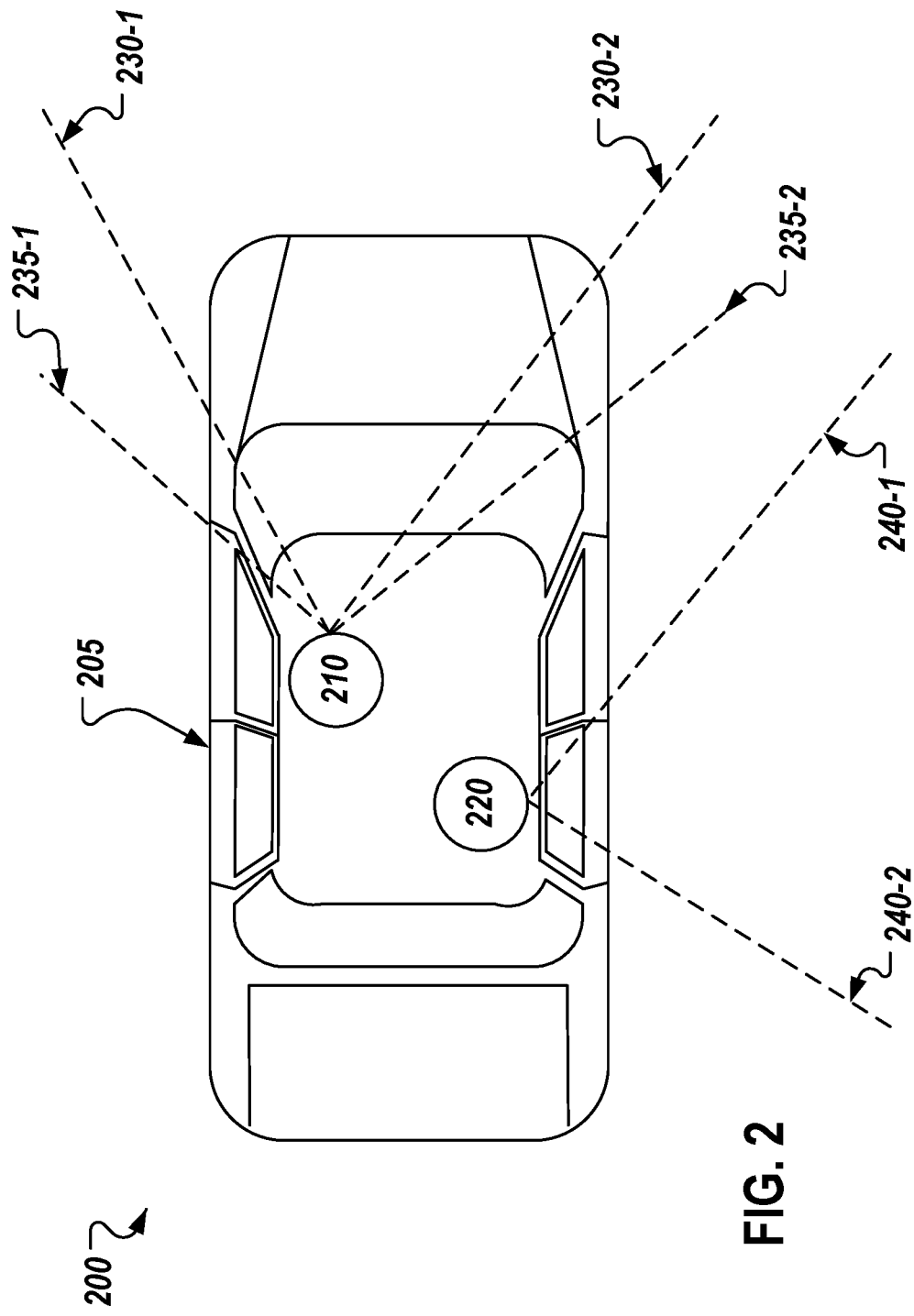
FIG. 2 is a block diagram of an example vehicle illustrating the field of view of the driver and passenger in the vehicle.

FIG. 2 is a diagram of an example vehicle 205 illustrating the field of view of the driver 210 and passenger 220 in the vehicle 205. The driver is sitting on the left side of the vehicle 205, and has a field of view represented using lines 235-1 and 235-2. If there is more traffic on the road, the driver 210 has to focus more on driving resulting in a reduced attention towards contents displayed on the physical structures. The evaluation apparatus 118 can determine a new field of view for a person based on the reduced attention factor that can be represented using dotted lines 230-1 and 230-2. The passenger 220 is sitting on right rear seat of the vehicle 205, and has a field of view through the right rear window of the vehicle 205 represented by dotted lines 240-1 and 240-2. Since the passenger 220 is not responsible for driving the car, and assuming that the passenger is not engaged in any other activity, the field of view of the passenger remains the same. The position of the driver 210 may be switched to opposite side dependent on the country in which they are driving.

In some implementations, the evaluation apparatus 118 determines a viewing time for a person based on whether the person is a driver or passenger of the vehicle. For example, the evaluation apparatus 118 can determine a total viewing time for drivers of vehicles traversing through the paths for the respective location. The total viewing time for drivers indicates a total duration of time during which a content displayed on the physical structure in the respective location is viewed by the drivers. The total viewing time can be further based on (or adjusted using) one or more of the factors mentioned above including the traffic in the subset of paths, the speed of the vehicles in the traffic, the time of the day, the viewing perspective, and the type of vehicle. For example, the evaluation apparatus 118 can measure (or compute) each of the factors as a value between 0 and 1. Further, the evaluation apparatus 118 can determine the total driver viewing time by summing over the viewing time of all the drivers and then multiplying each of the factors with the summed value. Similarly, the evaluation apparatus 118 can determine a total passenger viewing time of the passengers and a total additional people viewing time.

In some implementations, the evaluation apparatus 118 determines a viewability score based on the following equation $$V_{loc} = [\Sigma_t T_d(loc,t) * A_d(loc,t) + E_p(t) * T_p(loc,t) * A_p(loc,t)] + T_a(loc,t) * A_a(loc,t) \quad 1$$

where t includes all geographic paths traversed by travelers passing through the given geographic area from which a physical structure in a location loc can be viewed, $T_d$ is the total driver viewing time of the surface of a physical structure in the location loc, $A_d$ is the attention factor of the driver d, $T_p$ is the total passenger viewing time of the surface of a physical structure in location loc, $A_p$ is the attention factor of the passenger p, $E_p$ is the expected number of passengers in the vehicles on the geographic paths t, $T_a$ is the total additional people viewing time of the surface of a physical structure in the location loc As mentioned above, the viewability score can be generated for multiple different locations. The multiple different locations can include potential locations, also referred to as candidate locations, for the construction of a new physical structure, or existing locations of physical structures. In some implementations, the evaluation apparatus 118 selects a location from among the plurality of location in a geographic area 120 based on the viewability scores. For example, a higher viewability score of a location based on the formulation described above indicates that a display surface of a physical structure on the location has better viewability than a display surface of a physical structure at another location having a lower viewability score. In such a scenario, the evaluation apparatus 118 can be configured to select the location with a higher viewability score.

As discussed above, the selection of a location can be made by a content provider who will have content presented on the physical structure at the selected location. For example, a map interface can be presented to the content provider, and the viewability scores for different existing and/or candidate physical locations included in the geographic area depicted in the map interface can be presented to the content provider. As mentioned above, the viewability score presented to the content provider can be specialized based on one or more characteristics of the content provider. For example, the viewability scores can be generated based on the viewability of the physical structure by people who traveled by the physical structure, and ultimately performed some target action (e.g., visiting a location associated with, or offering, a particular topic or type of product). The viewability scores can also be generated based on whether the people who traveled by the physical structure ultimately obtained a particular type of item, or otherwise performed some specified target action. In this way, the viewability score can represent a value of the content provider presenting content on the physical structure, and the map interface can enable the content provider to quickly compare the relative values of multiple different physical structures in various locations to facilitate selection of one or more physical structures for presentation of content provided by the content provider.

In some implementations, after selecting a location in the geographic area 120 based on the viewability score, the location can be used to construct a new physical structure for displaying content. In another implementation, if a physical structure already exists in the selected location, the display properties of the physical structure can be adjusted. For example, if a location with a physical structure is selected based on a high viewability score and assuming that the existing display properties of the surface of the physical structure could be improved, the properties of the surface can be upgraded. For example, display properties can be changed by upgrading the lighting of the display surface for increased viewability during night. In another example, since the surface has a higher viewability score, changes can be made to the content displayed on the surface of the physical structure.

Alternatively, if a location with a physical structure is selected based on a low viewability score (e.g., during a specified time period), the existing display properties of the surface of the physical structure can be adjusted to save valuable resources. For example, a surface of a physical structure on a location with a low viewability score can be turned off during night to reduce energy consumption that is required for displaying content. In another example, a physical structure on a location with a low viewability score can be entirely removed due to poor viewability as indicated by the low visibility score.

As mentioned above, the adjustments to an existing physical structure can be made dynamically throughout the day and/or over other time periods to increase the efficiency of the physical structure. For example, turning on lights that illuminate the physical structure for only a portion of the night during which the viewability score of the physical structure is higher can save energy and reduce light pollution. Similarly, using the viewability score of a particular location to determine whether to build a new physical structure can reduce the wasted materials that may be used to construct a physical structure that is not going to effectively convey information to travelers passing the physical structure.

Figure 3:
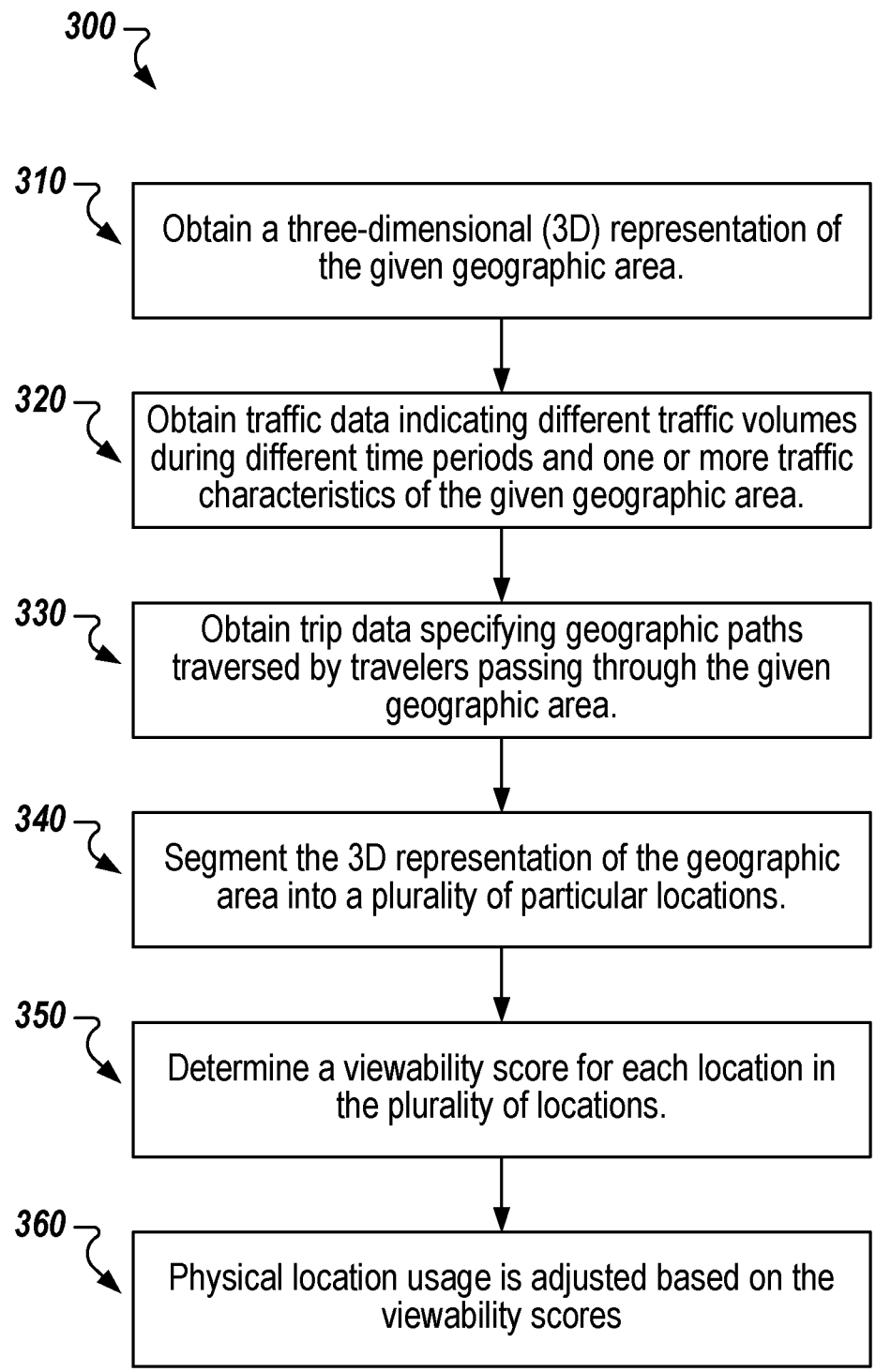
FIG. 3 is a flow diagram of an example process for determining a viewability score of a location and adjusting the physical location usage based on the viewability scores.

FIG. 3 is a flow diagram of an example process 300 for determining a viewability score and adjusting the physical location usage based on the viewability scores. Operations of the process 300 can be implemented, for example, by the map server 110 of the system 100 of FIG. 1, or one or more data processing apparatus. Operations of the process 300 can also be implemented as instructions stored on a non-transitory computer readable medium, where execution of the instructions can cause one or more data processing apparatus to perform operations of the process 300.

A three-dimensional (3D) representation of the given geographic area is obtained (310). For example, the evaluation apparatus 118 obtains the 3D map of a geographic area 120 from the map database 112 where a physical structure has to be adjusted in a location within the geographic area.

The evaluation apparatus 118 obtains traffic data indicating different traffic volumes during different time periods and one or more traffic characteristics of the given geographic area (320). For example, the evaluation apparatus 118 can use traffic data from the traffic database 114 that includes different traffic volumes recorded during different time periods of the day. The evaluation apparatus 118 can also obtain traffic data from other sources such as public agencies, roadway monitors, and traffic camera. The traffic data can also be obtained using the location information of the vehicles shared by the drivers or passengers of the vehicles with the map server 110. The traffic data can include both real-time and historical information regarding the volume of traffic and the speed of traffic flow at particular points in a transportation system.

The evaluation apparatus 118 obtains trip data specifying geographic paths traversed by travelers passing through the given geographic area (330). For example, the evaluation apparatus 118 can obtain trip data specifying different geographic paths traversed by travelers passing through the given geographic area to determine paths from which physical structures in a geographic location can be viewed. The trip data can be further used to estimate the number of people in the vehicles of the traffic, the speed of traffic, and/or other traffic characteristics.

The evaluation apparatus 118 segments the 3D representation of the geographic area into a plurality of particular locations (340). For example, the evaluation apparatus 118 can segment the geographic area 120 into locations 140-1 to 140-7.

The evaluation apparatus 118 determines a viewability score for each location in the plurality of locations (350). For example, the evaluation apparatus 118 can determine a total viewing time of the drivers and passengers of all vehicles traversing through the subset of paths for each location in the plurality of locations that indicates a total duration of time during which content displayed on the physical structure in the each of the respective locations is viewed by all the drivers and the passengers. The evaluation apparatus 118 further determines an attention factor for each individual driver and passenger of the vehicles in the traffic based on the field of view, the speed of the vehicles, the time of the day, and the traffic conditions. Finally, the evaluation apparatus 118 determines the viewability score of each of the locations in the geographic area 120. In some implementations, the evaluation apparatus 118 can use equation 1, discussed above, to determine the viewability score. Also discussed above, the viewability scores can be specialized by using characteristics associated with a particular content provider (or another entity), who is evaluating physical locations for presentation of content.

The physical location usage is adjusted based on the viewability scores (360). For example, if a location with a physical structure is selected based on a high viewability score the lighting of the display surface can be upgraded for increased viewability during night and/or to reduce power consumption. For example, for a physical structure that is going to be illuminated at night, halogen lights can be replaced with LED lights to reduce power consumption. Alternatively, if a location with a physical structure is selected based on a low viewability score, the existing display properties of the surface of the physical structure can be adjusted to save valuable resources. For example, a surface of a physical structure at a location with a low viewability score can be turned off during night to reduce electric consumption that is required for displaying content. In another example, a physical structure at a location with a low viewability score can be entirely removed due to poor viewability as indicated by the low visibility score.

In another example, if a location is selected to construct a new physical structure, the viewability score of the location can be used to determine the costs associated with acquiring the location. For example, a geographic location with a higher viewability score can have a higher monetary value compared to another geographic location with lower viewability score. In another example, the viewability score can be used to determine a value associated with presenting a content on the physical structures in a location. For example, the cost incurred by an entity for presenting a content on a physical structure can be directly proportional to the viewability score of the location. For example, the cost of presenting content on a physical structure in a location with a high viewability score will generally be more than the cost of presenting content on a physical structure in other locations with lower viewability scores.

In general, people while traversing through a geographic area can get exposed to multiple contents displayed on multiple physical structures in multiple locations distributed throughout the geographic area 120. In such a situation, people can get exposed to the same content that is displayed on different physical structures located in different locations. For example, a geographic area can include two or more physical structures in two different locations displaying the same content. Each of these multiple exposures can contribute to the user performing a specified target action, but it can be difficult to determine how much each content exposure contributes to the performance of a subsequent target action by a person. To determine the relative contribution of each of the content exposures that occurred while traversing through the geographic area 120, the evaluation apparatus 118 determines a contribution score for each physical structure in different locations displaying the same content based on path traversed by people. In some implementations, determining a contribution score for each exposure can include determining a viewability score for each of the physical structures in different locations in the geographic area displaying the content.

To determine a viewability score for each of the physical structures that can be viewed from the geographic path traversed by the set of users, the evaluation apparatus 118 can obtain trip data shared by people who are also the users of the geospatial mapping service. The trip data in particular specifies the path within the geographic area 120 traversed by the given set of users that include the drivers and passengers of vehicles present in the geographic area 120.

In some implementations, the evaluation apparatus 118 obtains semantic data that specifies the variety of content displayed on physical structures in the plurality locations of the geographic area 120 to which the given set of users is exposed while traversing through the geographic area 120 via the geographic path as indicated by the trip data. In some implementations, the evaluation apparatus 118 can process the 3D map of the geographic area to determine the variety of content. For example, assume that a geographic path passes through one or more geographic locations in the geographic area 120 where each geographic location can include a physical structure to display content. In such a scenario, the semantic data corresponding to the geographic path will represent, characterize, or identify the content displayed on each of the one or more physical structures in one or more locations of the geographic area 120. For the purpose of explanation, the techniques are further explained with reference to an example scenario shown in FIG. 4.

Figure 4:
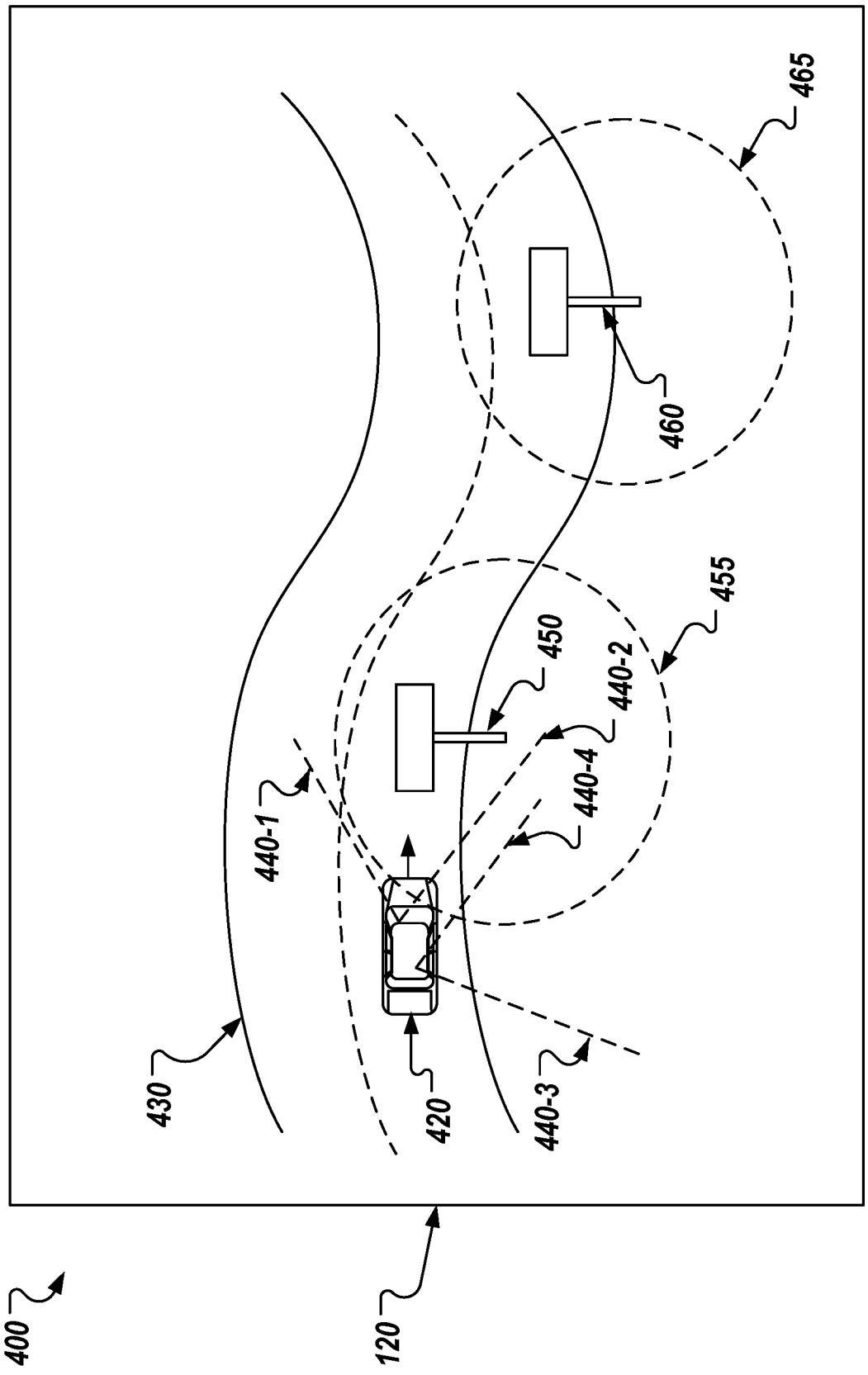
FIG. 4 is a visual representation of the example scenario where drivers and passengers of a vehicle traversing through a geographic path get exposed to multiple physical structures in multiple locations.

FIG. 4 is a visual representation of the example scenario where a vehicle 420 is traversing through a geographic area 120 via a geographic path 430. The geographic path 430 is determined using trip data for a set of users that includes the driver and the passengers of the vehicle 420. It can be seen that further down the geographic path 430, there are two physical structures 450 and 460 that are within the field of view of the driver (represented using lines 440-1 and 440-2) and the passengers (represented using lines 440-3 and 440-4) of the vehicle 420. For the purpose of explanation, the two physical structures are assumed to display the same content, but the content could be provided by the same content provided and differ, or otherwise be related to the same topic.

In some implementations, the evaluation apparatus 118 can determine an exposure time of content for each of the physical structures among the multiple physical structures that the set of users were exposed to during a trip through the geographical area 120. The exposure time indicates the total viewing time of content displayed on physical structures by the set of people that includes the driver and the passengers. For example, assume that the two physical structures 450 and 460 display the same content. The set of users (e.g., the driver and passengers of the vehicle 420) will get exposed to content displayed by each of the two physical structures 450 and 460. The evaluation apparatus 118 can determine an exposure time for the content displayed on each of the physical structures based on the field of view of the set of people, the speed of the vehicle, the time of the day, the viewing perspective, the type of vehicle, and/or other factors.

In some implementations, the evaluation apparatus 118 can determine, based on the trip data and the traffic data, an expected number of people in the vehicle. Depending on the particular implementation, the set of users can include a number of people in a single vehicle or multiple vehicles. To determine the exposure time for each of the multiple physical structures (physical structures 450 and 460), the evaluation apparatus 118 can delineate the set of users into drivers and passengers and based on the delineation, computes an attention factor for the driver and the passengers. As mentioned before, the attention factor of a person changes based on the activities performed by that person and one or more traffic characteristics that includes the volume of traffic, the speed of the vehicles passing through the geographic area, the seating arrangement of the vehicle, and/or visibility characteristics during a time of the day.

In some implementations, the evaluation apparatus 118 determines a viewability score, for example, using equation 1 (described above) for content presented to the set of users while traversing through the geographic area 110 via a geographic path as indicated by the trip data. The evaluation apparatus 118 takes into consideration multiple factors for computing the viewability score including the geographic path 430 in the geographic area 120, traffic volume in the geographic path 430, the time of the day when the trip was being made, speed of the vehicles in the geographic path 430 in different traffic conditions, an estimate of the number of users in the set of users including passengers and drivers in the vehicles traversing through the geographic path 430, and/or the amount of time during which the content on each of the physical structures can be viewed from the geographic path 430.

In some implementations, the evaluation apparatus can determine an exposure time indicating an aggregate amount of time that a given set of users was exposed to specific content while traversing the geographic path. The exposure time can be represented by the viewability score or computed separately from the viewability score. For example, the exposure time can be computed as a sum of the time that the given set of users were exposed to the specific content. In some situations, the exposure time can be adjusted using various factors, like those discussed above with reference to the viewability score.

In some implementations, the evaluation apparatus 118 determines a contribution score that indicates the relative contributions of each the content exposures towards performance of a target action. For example, the viewability score or exposure time of each of the content exposures can be used to generate a respective contribution score towards performance of the target action. For example, the viewability score or exposure time can be used as an input parameter of a function that can generate a contribution score based on the viewability score or exposure time. In some situations, the contribution score for each exposure can be proportional to a ratio of the exposure time for that exposure relative to the total exposure time of all exposures. Another technique of calculating a contribution score from a viewability score or exposure time is by using heuristics defined by the system administrator. For example, if the contribution of an exposure is directly proportional to the viewability score or exposure time, a higher viewability score or exposure time for the content that is displayed on a physical structure results in a higher contribution score. More specifically, if the viewability score or exposure time for the content on physical structure 450 is more than the viewability score or exposure time for the content on physical structure 460, the contribution score of the exposure due to physical structure 450 will be more than that of physical structure 460.

The evaluation apparatus 118 uses the contribution score to segment attribution of user actions (e.g., specified target actions) performed by a given set of users. In some implementations, the attribution can be proportional to the contribution scores determined for each content exposure. For example, assume that the contribution score for the content presented on the physical structure 450 is 0.6, and the contribution score for the content presented on the physical structure 460 is 0.4. In this example, the content presented on the physical structure 450 can be attributed 60% of the credit for the performance of a user action, while the physical structure 460 can be attributed 40% of the credit for the performance of the user action. As discussed above, the user action can be any specified target action (e.g., as specified by the content provider), such as making a phone call, signing up to volunteer, making a purchase of an item, or some other specified target action.

In some situations, the contribution of content exposures can include cross-channel exposures. For example, some of the content exposures can be online content exposures, while other content exposures can be exposures to content presented on physical structures. In this example, the contribution of each content exposure can be determined in view of all of the cross-channel exposures to provide for a more global view of the influence of different content exposures. The cross-channel exposures can each be weighted, for example, based on the type of exposure (e.g., active vs. passive), length of exposure, elapsed time between the exposure and performance of the specified target action, and/or other factors.

In some implementations, the evaluation apparatus 118 can adjust the physical location usage of a selected particular physical location based on a portion of the segmented attribution that is assigned to the content. The contribution score indicates a measure of the effect that a particular content exposure has on a person or set of people. If a location with a physical structure has a high contribution score, and the existing display properties of the surface could be upgraded, the properties of the surface can be upgraded to enhance the content presented by the physical structure. For example, display properties can be changed by upgrading the lighting of the display surface for increased viewability during night, replacing a lower resolution display with a higher resolution display, or adjusting a viewing angle of the display. In another example, the higher contribution score can be used as a basis for enhancing the type of content displayed on the physical structure.

Alternatively, if a location with a physical structure has a low contribution score, the existing display properties of the surface of the physical structure can be adjusted to save valuable resources. For example, a surface of a physical structure having a low contribution score can be turned off at night to reduce electric consumption that is required for displaying content. In another example, a physical structure at a location with a low contribution score can be entirely removed based on the low contribution score.

As mentioned above, the performance of a subsequent target action after multiple content exposures of a content displayed on different physical structures can be attributed to each of the multiple exposures based on the relative contribution score. The attribution of the performance of a target action can be expressed in a variety of ways. For example, the attribution of the performance can be expressed as a likelihood that users will perform the specified target action following one or more content exposures. This is further explained with reference to FIG. 5.

Figure 5:
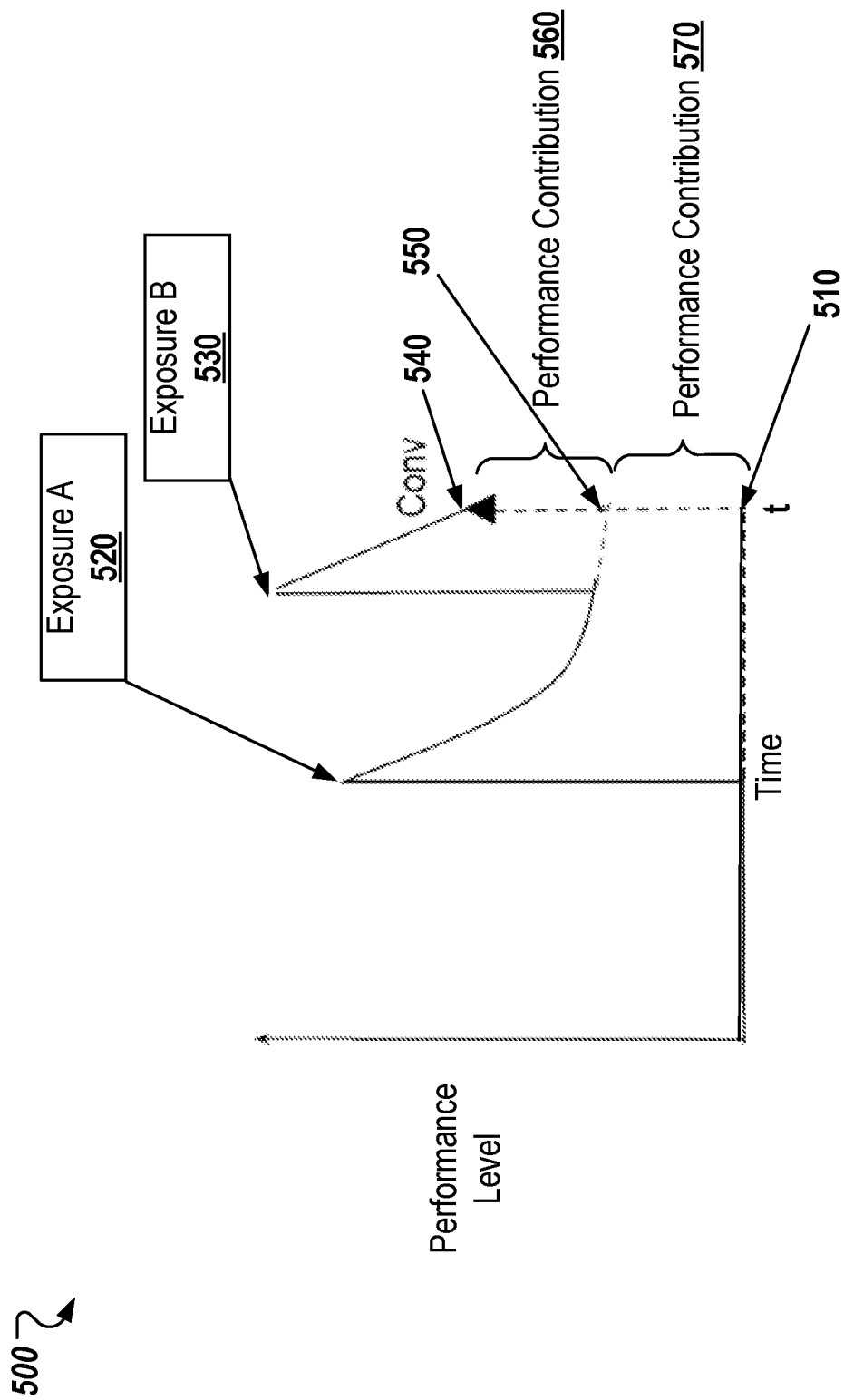
FIG. 5 is a graph illustrating the contribution of exposures to multiple contents.

FIG. 5 is a graph 500 illustrating the contribution of exposures to multiple contents. Initially, the performance level is at the baseline performance level 510. When the user experiences exposure A 520 (e.g., exposure to content via physical structure 450), the performance level rises and then starts to decay with time. The user then experiences exposure B 530 (e.g., exposure to content via physical structure 460), causing the performance level to rise and then again decay with time.

At time t, which follows exposure B 530, the user performs the target action (e.g., a conversion). In this example, the performance level decays to the final performance level 540. In this example, the final performance level 540 includes contributions from both of exposure 520 and exposure 530. For purposes of illustration as to the remaining incremental effects of these two exposures, assume that exposure B 530 did not occur, but the target action still occurred at time t. In this example, the performance level remaining at time t would have decayed to 550 in the absence of exposure B 530. In this case, the performance contribution 560 attributed to exposure B 530 is the difference between performance levels 540 and 550, such that exposure B 530 can be attributed a portion of the credit for the performance of the target action based on the difference between the performance levels 540 and 550.

Continuing with this example, the performance contribution 570 of exposure A 520 at time t can be illustrated by considering the difference between the baseline performance level 510 and the performance level 550 that would have existed if exposure A 520 occurred, but exposure B 530 had not occurred. For example, the performance contribution 685, and therefore portion of credit for performance of the target action, attributable to exposure A 510 is the portion of the performance level at time t that exceeds the baseline performance level 690.

As mentioned above, people who are exposed to content that is displayed on physical structures may also be exposed to content via other techniques of content exposure. For example, people connected to the internet are exposed to a variety of digital content (e.g., search results, web pages, digital components, news articles, social media posts, audio information output by a digital assistant device). These different techniques of exposures to content may also contribute to the users performing a specified target action. For example, a user who is exposed to a web page about a particular type of mobile device is also exposed to content related to the same type of mobile device on a physical structure may ultimately acquire that particular type of mobile device.

It can be difficult to determine how much each content exposure, which can include different techniques and mediums of exposure, contributes to a user performing a subsequent target action. For example, assume a user searches for "sports cars", reviews search results returned in response to submission of the search query "sports cars", is exposed to online content depicting a particular brand of sports car, gets exposed to a physical structure displaying the same brand of sports cars and submits a request to obtain information about acquiring the particular brand of sports car. In this example, the amount by which each of those different content exposures contributed to the user's subsequent submission of a request to obtain information about acquiring the particular brand of sports car is difficult to quantify. However, any information about the relative contributions of each form of content exposure can be derived and used by one or more content distribution systems (where each content distribution system relates to a particular form of content exposure) to more efficiently and effectively present the user with information that is relevant to the user, and also allows third parties to understand how the content they produce and distribute affect subsequent user actions.

In some implementations, the evaluation apparatus 118 can use appropriate algorithms and machine learning models to attribute the performance of the target action to not just the physical structures displaying the same content, but also to exposures via other techniques of content exposure. In such situation, mathematical relationships can be used to represent and/or quantify the total performance level. For example, if the user's performance of the specified target action is based on exposure to digital content and exposure to content via physical structures, the performance level for a specified target action is represented by:

$$X = X_p + X_o$$

where X represents the total contribution, $X_p$ is the contribution due to exposure via physical structures and $X_o$ is the contribution due to exposure to digital content.

In some implementations, the evaluation apparatus 118 can select a location from among the plurality of locations in a geographic area 120 based on the attribution of the subsequent target action to adjust the physical location usage of the selected location. Attribution provides a measure of how much a particular content exposure is responsible for performance of a target action. For example, if a content exposure via a physical structure in a location is highly attributed for the performance of the target action by the set of users, and assuming that the existing display properties of the surface of the physical structure could be improved, the properties of the surface can be upgraded. For example, display properties can be changed by upgrading the lighting of the display surface for increased viewability during night. In another example, since the surface has a higher attribution towards performance of a target action, one or more units of content can be displayed on the surface of the physical structure.

Alternatively, if a location with a physical structure is selected because the exposure via the physical structure of the location is less, the existing display properties of the surface of the physical structure can be adjusted to save valuable resources.

Figure 6:
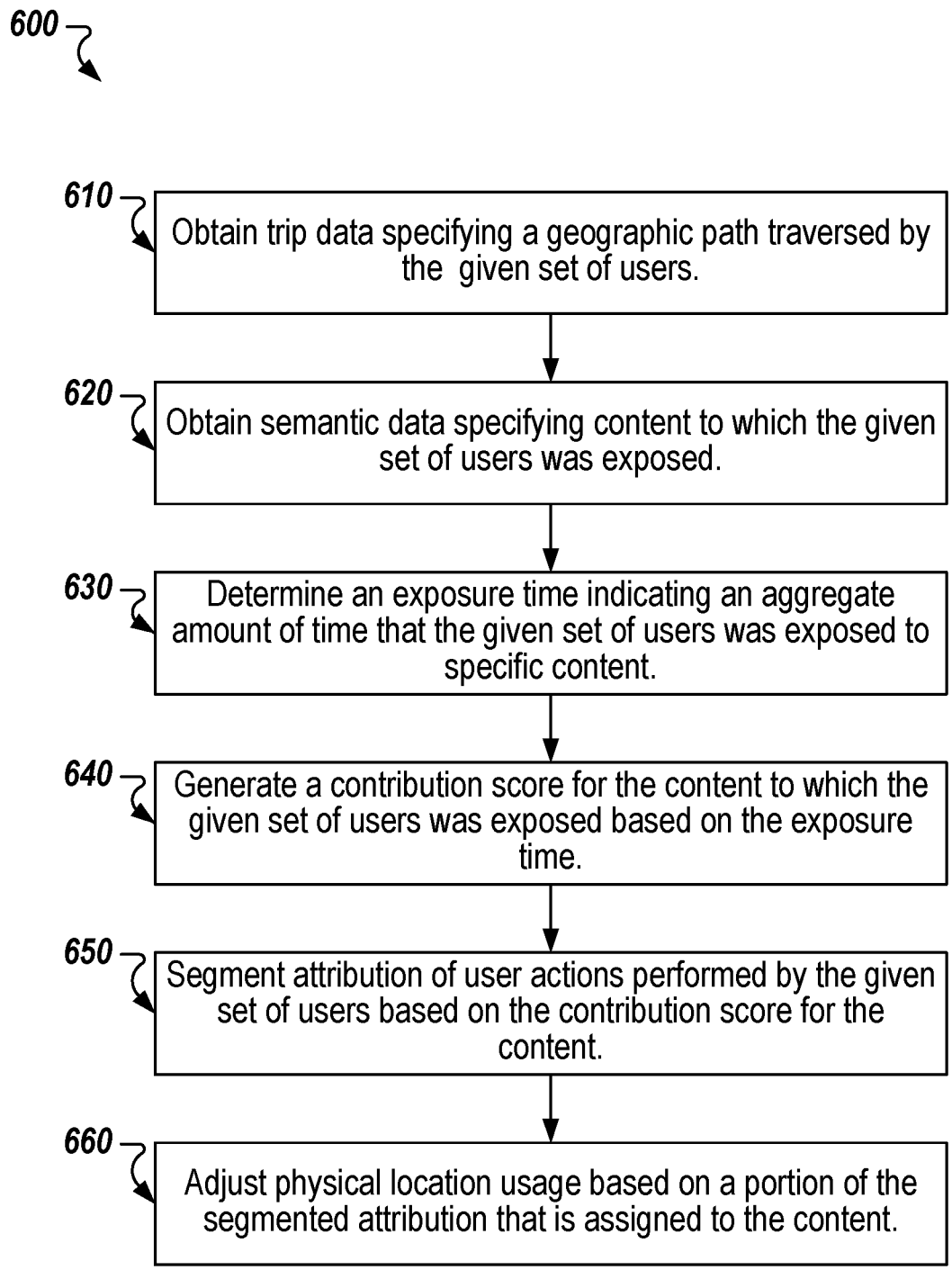
FIG. 6 is a flow diagram of an example process for generating a contribution score and segmenting attribution of user actions based on the contribution scores.

FIG. 6 is flow diagram of an example process 600 for generating a contribution score and segmenting attribution of user actions based on the contribution scores. Operations of the process 600 can be implemented, for example, by the evaluation apparatus 118 of the system 100 of FIG. 1, or one or more data processing apparatus. Operations of the process 600 can also be implemented as instructions stored on a non-transitory computer readable medium, where execution of the instructions can cause one or more data processing apparatus to perform operations of the process 600.

The data evaluation apparatus 118 obtains trip data specifying a geographic path traversed by the given set of users (610). For example, the evaluation apparatus 118 can obtain trip data shared by people to identify the paths within the geographic area 120 traversed by the given set of users through the geographic area 120.

The data evaluation apparatus 118 obtains semantic data specifying content to which the given set of users was exposed (620). For example, the evaluation apparatus 118 obtains semantic data that specifies the variety of content displayed on physical structures in the plurality locations of the geographic area 120 to which the given set of users is exposed while traversing through the geographic area 120 via the geographic path, as indicated by the trip data. The evaluation apparatus 118 can also obtain semantic data by processing the 3D map of the geographic area by determine the variety of contents displayed on physical structures.

The evaluation apparatus 118 determines an exposure time indicating an aggregate amount of time that the given set of users was exposed to specific content (630). For example, the evaluation apparatus 118 can determine an exposure time of content for each of the physical structures among the multiple physical structures to which the set of users were exposed during a trip through the geographical area 120. For example, the evaluation apparatus 118 determines the amount of time that the set of users that includes the drivers and passengers of the vehicle 420 gets exposed to content displayed by each of the two physical structures 450 and 460.

The evaluation apparatus 118 generates a contribution score for the content to which the given set of users was exposed based on the exposure time (640). For example, the viewability score or exposure time of content exposures via a physical structure in each of the multiple locations can be used as a respective contribution score towards performance of the target action or can be used to calculate a respective contribution score. In some implementations, the viewability score or exposure time can be used as an input parameter of a function that can generate a contribution score based on the viewability score or exposure time. Another technique of calculating a contribution score from a viewability score is by using heuristics defined by a system administrator or content provider. For example, if the contribution of an exposure is directly proportional to the viewability score or exposure time, a higher viewability score or exposure time of the content that is displayed on a physical structure results in a higher contribution score. For example, if the viewability score or exposure time of the content on physical structure 450 is more than the viewability score or exposure time of the content on physical structure 460, the contribution score of the exposure due to physical structure 450 will be more than that of physical structure 460.

The evaluation apparatus 118 segments attribution of user actions performed by the given set of users based on the contribution score for the content (650). For example, the performance of a subsequent target action for a set of users after multiple content exposures of a content displayed on different physical structures can be attributed to each of the multiple exposures based on the relative contribution score. For example, in FIG. 5, the final performance level 540 includes performance contributions from both of exposure 520 and exposure 530.

The physical location usage can be adjusted based on a portion of the segmented attribution that is assigned to the content (660). For example, if a content exposure via a physical structure in a location is highly attributed for the performance of the target action by the set of users and assuming that the existing display properties of the surface of the physical structure is not optimum, the properties of the surface can be upgraded. Alternatively, if a location with a physical structure is selected because the exposure via the physical structure of the location is less, the existing display properties of the surface of the physical structure can be adjusted to save valuable resources.

Figure 7:
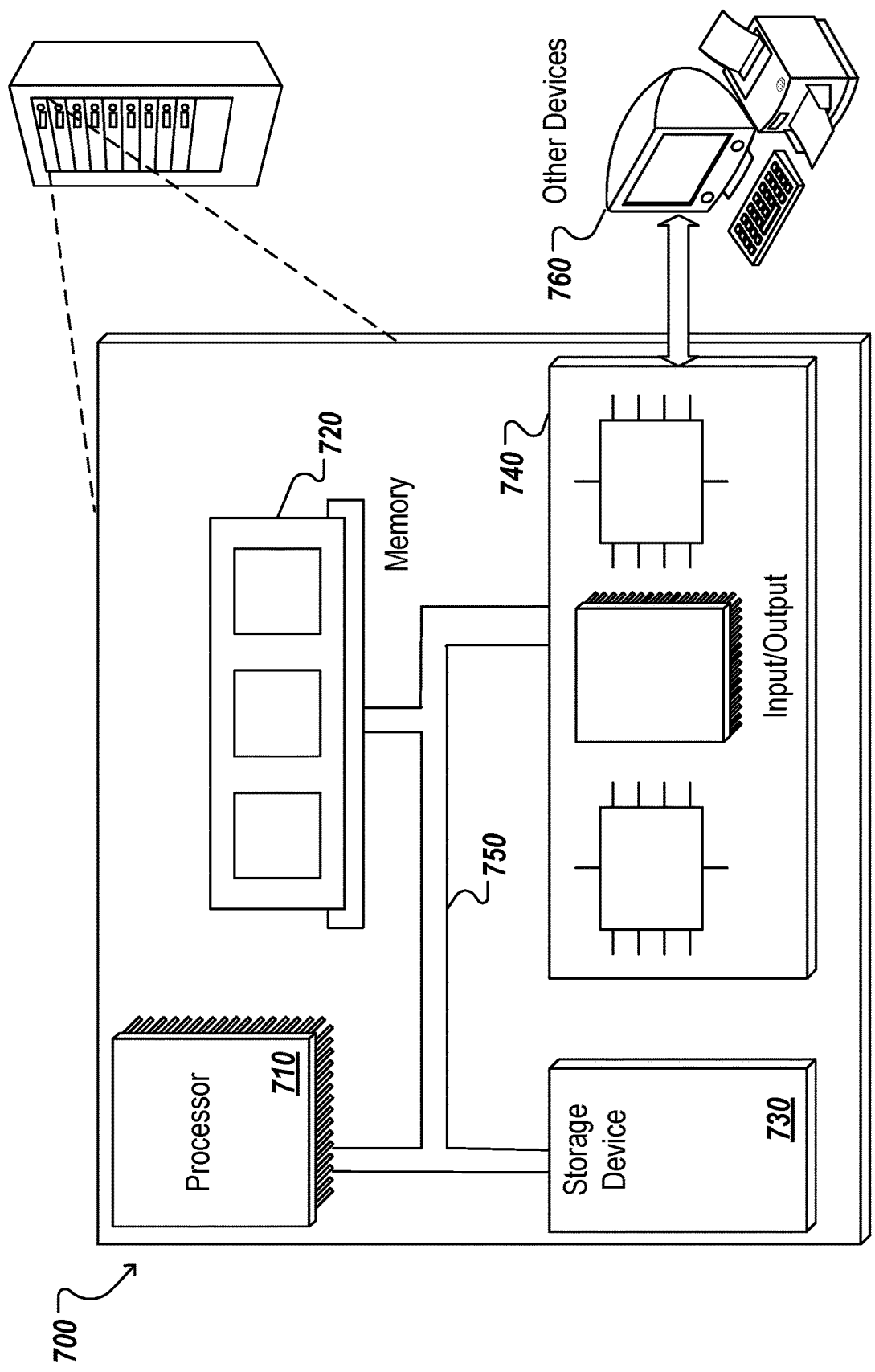
FIG. 7 is a block diagram of an example computer system that can be used to perform operations described.

FIG. 7 is block diagram of an example computer system 700 that can be used to perform operations described above. The system 700 includes a processor 710, a memory 820, a storage device 830, and an input/output device 840. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 820 or on the storage device 730.

The memory 720 stores information within the system 800. In one implementation, the memory 720 is a computer-readable medium which may be non-transitory. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium which may be non-transitory. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In one implementation, the input/output device 740 can include one or more of a network interface devices, e.g., an ethernet card, a serial communication device, e.g., and rs-232 port, and/or a wireless interface device, e.g., and 802.11 card. In another implementation, the input/output device can include driver devices configured to receive input data and send output data to other devices 760, e.g., keyboard, printer and display devices 370. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple cds, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an fpga (field programmable gate array) or an asic (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an fpga (field programmable gate array) or an asic (application specific integrated circuit).

Processors suitable for the execution of a computer program include, by way of example, both general and special purpose microprocessors. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (pda), a mobile audio or video player, a game console, a global positioning system (gps) receiver, or a portable storage device (e.g., a universal serial bus (usb) flash drive), to name just a few. Devices suitable for storing computer program instructions and data include all forms of non volatile memory, media and memory devices, including by way of example semiconductor memory devices, e.g., eprom, eeprom, and flash memory devices; magnetic disks, e.g., internal hard disks or removable disks; magneto optical disks; and cd rom and dvd-rom disks. The processor and the memory can be supplemented by, or incorporated in, special purpose logic circuitry.

To provide for interaction with a user, embodiments of the subject matter described in this specification can be implemented on a computer having a display device, e.g., a crt (cathode ray tube) or lcd (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("lan") and a wide area network ("wan"), an inter-network (e.g., the internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an html page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   obtaining, for a given geographic area, a three-dimensional (3D) representation of the given geographic area, wherein the 3D representation depicts a view of the given geographic area from a specified viewing perspective;
   obtaining, for the given geographic area, traffic data indicating (i) different traffic volumes during different time periods and (ii) one or more traffic characteristics;
   segmenting, by one or more computing devices, the 3D representation into a plurality of particular locations;
   determining, for each different particular location among the plurality of particular locations and based on the traffic data, a viewability score indicative of an aggregate amount of time that the different particular location is viewable by traffic passing the different particular location; and
   adjusting physical location usage based on the viewability scores for the plurality of particular locations, wherein adjusting the physical location usage comprises:
      selecting, based on the viewability scores, a location from among the plurality of particular locations to present content on a physical structure geographically located at the selected location; and
      adjusting, based on the viewability scores, the content displayed on a surface of the physical structure and/or an existing display property of the surface of the physical structure over time.

2. The computer-implemented method of claim 1, further comprising obtaining trip data specifying geographic paths traversed by travelers passing through the given geographic area, wherein the travelers include (i) drivers of vehicles that pass through the given geographic area, (ii) passengers of the vehicles that pass through the geographic area, or (iii) additional persons who travel through the given geographic area, but are neither drivers nor passengers.

3. The computer-implemented method of claim 2, wherein the specified viewing perspective comprises one or more of a driver's field of view that specifies the field of view of the given geographic area for the drivers, a passenger's field of view that specifies the field of view of the given geographic area for the passengers, or an additional person's field of view that specifies the field of view of the given geographic area for additional persons.

4. The computer-implemented method of claim 2, wherein determining the viewability score comprises determining a total time during which a physical structure located in the given geographic area is in the specified viewing perspective of the drivers, passengers or the additional persons.

5. The computer-implemented method of claim 1, wherein the one or more traffic characteristics comprises (i) a speed of vehicles that pass through the given geographic area, (ii) a number of drivers or passengers of the vehicles that pass through the given geographic area, (iii) visibility characteristics during a time of the day when the one or more traffic characteristics are recorded.

6. The computer-implemented method of claim 5, wherein determining the viewability score for a geographic location further comprises:
   determining a viewing time of people in the vehicles while travelling on a geographic path through the geographic area;
   determining an attention factor of the people in the vehicles while travelling on the geographic path through the geographic area based on one or more traffic characteristics;
   determining an expected number of people in the vehicles in the traffic; and
   computing a viewability score based on the viewing time, attention factor and the expected number of people in a vehicle.

7. The computer-implemented method of claim 1, wherein adjusting the physical location usage further comprises at least one of:
   constructing a physical structure in one or more geographic locations;
   removing existing physical structures from the one or more geographic locations;
   placing one or more contents on the physical structure of the one or more geographic locations; or
   adjusting viewing characteristics of the one or more contents that is presented on the physical structure of the one or more geographic locations.

8. A system, comprising:
   one or more processors; and
   a memory having stored thereon computer-readable instructions configured to cause the one or more processors to perform operations of:
      obtaining, for a given geographic area, a three-dimensional (3D) representation of the given geographic area, wherein the 3D representation depicts a view of the given geographic area from a specified viewing perspective;
      obtaining, for the given geographic area, traffic data indicating (i) different traffic volumes during different time periods and (ii) one or more traffic characteristics;

segmenting, by one or more computing devices, the 3D representation into a plurality of particular locations;

determining, for each different particular location among the plurality of particular locations and based on the traffic data, a viewability score indicative of an aggregate amount of time that the different particular location is viewable by traffic passing the different particular location; and adjusting physical location usage based on the viewability scores for the plurality of particular locations, wherein adjusting the physical location usage comprises:

selecting, based on the viewability scores, a location from among the plurality of particular locations to present content on a physical structure geographically located at the selected location; and adjusting, based on the viewability scores, the content displayed on a surface of the physical structure and/or an existing display property of the surface of the physical structure over time.

9. The system of claim 8, further comprising obtaining trip data specifying geographic paths traversed by travelers passing through the given geographic area, wherein the travelers include (i) drivers of vehicles that pass through the given geographic area, (ii) passengers of the vehicles that pass through the given geographic area, or (iii) additional persons who travel through the geographic area, but are neither drivers nor passengers.

10. The system of claim 9, wherein the specified viewing perspective comprises one or more of a driver's field of view that specifies the field of view of the given geographic area for the drivers, a passenger's field of view that specifies the field of view of the given geographic area for the passengers, or an additional person's field of view that specifies the field of view of the given geographic area for additional persons.

11. The system of claim 8, wherein the one or more traffic characteristics comprises (i) a speed of vehicles that pass through the given geographic area, (ii) a number of drivers or passengers of the vehicles that pass through the given geographic area, (iii) visibility characteristics during a time of the day when the one or more traffic characteristics are recorded.

12. The system of claim 8, wherein determining the viewability score comprises determining a total time during which a physical structure located in the given geographic area is in the specified viewing perspective of drivers, passengers or additional persons.

13. The system of claim 12, wherein determining the viewability score for a geographic location further comprises:

determining a viewing time of people in vehicles while travelling on a geographic path through the geographic area;

determining an attention factor of the people in the vehicles while travelling on the geographic path through the geographic area based on one or more traffic characteristics;

determining an expected number of people in the vehicles in the traffic; and computing a viewability score based on the viewing time, attention factor and the expected number of people in a vehicle.

14. The system of claim 8, wherein adjusting the physical location usage further comprises at least one of:

constructing a physical structure in one or more geographic locations;

removing existing physical structures from the one or more geographic locations;

placing one or more contents on the physical structure of the one or more geographic locations; or adjusting viewing characteristics of the one or more contents that is presented on the physical structure of the one or more geographic locations.

15. A non-transitory computer readable medium storing instructions that, when executed by one or more data processing apparatus, cause the one or more data processing apparatus to perform operations comprising:

obtaining, for a given geographic area, a three-dimensional (3D) representation of the given geographic area, wherein the 3D representation depicts a view of the given geographic area from a specified viewing perspective;

obtaining, for the given geographic area, traffic data indicating (i) different traffic volumes during different time periods and (ii) one or more traffic characteristics;

segmenting, by one or more computing devices, the 3D representation into a plurality of particular locations;

determining, for each different particular location among the plurality of particular locations and based on the traffic data, a viewability score indicative of an aggregate amount of time that the different particular location is viewable by traffic passing the different particular location; and adjusting physical location usage based on the viewability scores for the plurality of particular locations, wherein adjusting the physical location usage comprises:

selecting, based on the viewability scores, a location from among the plurality of particular locations to present content on a physical structure geographically located at the selected location; and adjusting, based on the viewability scores, the content displayed on a surface of the physical structure and/or an existing display property of the surface of the physical structure over time.

16. The non-transitory computer readable medium of claim 15, further comprising obtaining trip data specifying geographic paths traversed by travelers passing through the given geographic area, wherein the travelers include (i) drivers of vehicles that pass through the given geographic area, (ii) passengers of the vehicles that pass through the given geographic area, or (iii) additional persons who travel through the geographic area, but are neither drivers nor passengers.

17. The non-transitory computer readable medium of claim 16, wherein the specified viewing perspective comprises one or more of a driver's field of view that specifies the field of view of the given geographic area for the drivers, a passenger's field of view that specifies the field of view of the given geographic area for the passengers, or an additional person's field of view that specifies the field of view of the given geographic area for additional persons.

18. The non-transitory computer readable medium of claim 15, wherein the one or more traffic characteristics comprises (i) a speed of vehicles that pass through the given geographic area, (ii) a number of drivers or passengers of the vehicles that pass through the given geographic area, (iii) visibility characteristics during a time of the day when the one or more traffic characteristics are recorded.

19. The non-transitory computer readable medium of claim 15, wherein determining the viewability score comprises determining a total time during which a physical structure located in the given geographic area is in the specified viewing perspective of drivers, passengers or additional persons.

20. The non-transitory computer readable medium of claim 15, wherein determining the viewability score for a geographic location further comprises:
- determining a viewing time of people in vehicles while travelling on a geographic path through the geographic area;
- determining an attention factor of the people in the vehicles while travelling on the geographic path through the geographic area based on one or more traffic characteristics;
- determining an expected number of people in the vehicles in the traffic; and
- computing a viewability score based on the viewing time, attention factor and the expected number of people in a vehicle.

* * * * *